United States Patent [19]
Walters, Jr.

[11] 4,072,253
[45] Feb. 7, 1978

[54] ROTARY FEEDER
[75] Inventor: Thomas Walters, Jr., Primos, Pa.
[73] Assignee: Ecolaire Incorporated, Philadelphia, Pa.
[21] Appl. No.: 652,351
[22] Filed: Jan. 26, 1976
[51] Int. Cl.² .............................................. G01F 11/10
[52] U.S. Cl. .................................. 222/368; 214/35 A
[58] Field of Search ...................... 222/368, 362, 410; 198/219; 214/35 A

[56] References Cited
U.S. PATENT DOCUMENTS
3,556,355  1/1971  Ruiz ..................................... 222/368
3,664,491  5/1972  Scanlon et al. .................. 198/219 X Primary Examiner—Allen N. Knowles
Assistant Examiner—Hadd Lane
Attorney, Agent, or Firm—Seidel, Gonda & Goldhammer

[57] ABSTRACT

A rotary feeder is disclosed for feeding abrasive materials at high temperatures up to about 2300° F. Each of the rotor and stator have preformed refractory inserts removably retained in position without separate fasteners being used. The inserts are preferably preformed with a camber to facilitate spring-like retention thereof.

12 Claims, 4 Drawing Figures

U.S. Patent  Feb. 7, 1978  4,072,253
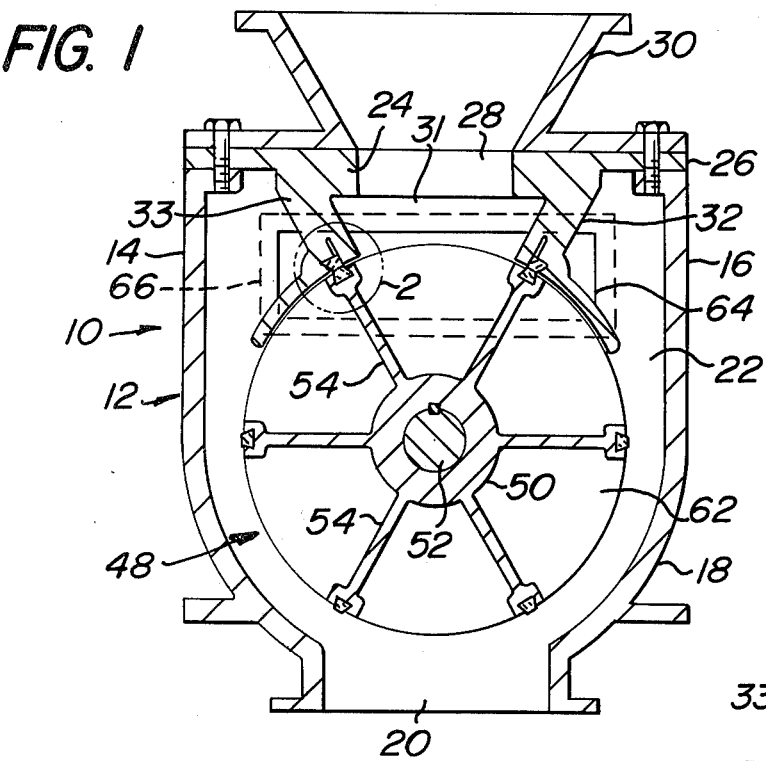
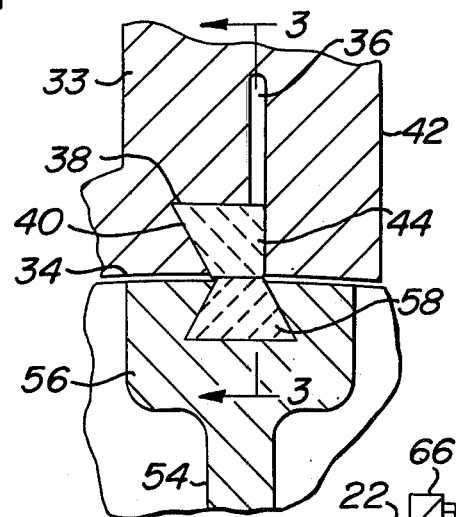
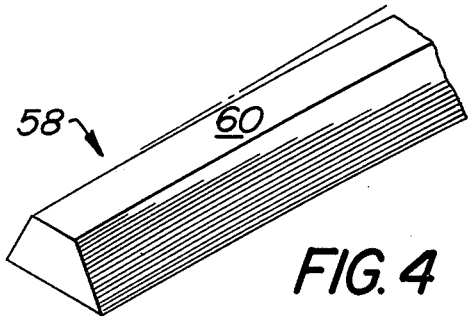
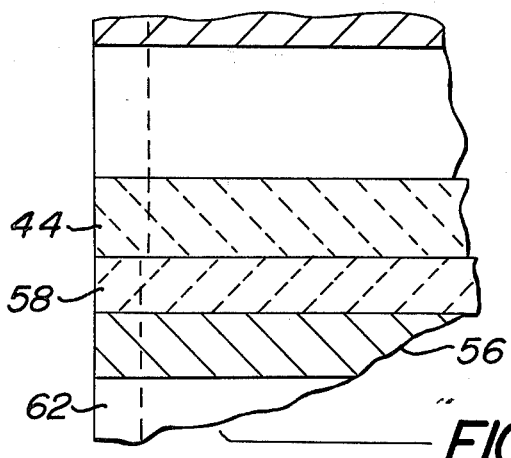
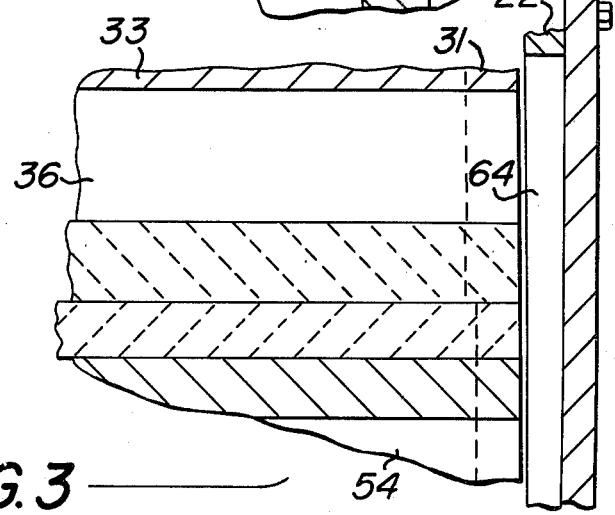

ROTARY FEEDER

BACKGROUND

Feeders presently available for feeding abrasive particles ranging from a size of 3 to 4 inches in diameter down to 1/64 inch to a few thousands of an inch at an elevated temperature must be hard coated or hard faced in the areas exposed to the particles. If such areas are not hard coated or hard faced, they wear out very quickly.

Current hard coatings from a few thousands of an inch to approximately 1/100 inch depend entirely on the hot brinnelling property of the backup metal. For heavy duty, such feeders are limited to use at temperatures less than 1800° F. If a thicker hard facing is used, that is 1/16 to 1/8 inch, the connection between the hard facing and the back of metal is subject to cracking due to thermal stresses at such elevated temperatures. Hence, the hard facing approach likewise has an upper temperature limit of less than 1800° F.

The problem solved by this invention is the construction of a feeder for heavy duty use with a temperature operating range up to about 2300° F. while feeding abrasive particles, and at the same time being practical with the ability to make maintenance repairs with minimum down time.

DISCLOSURE

The present invention is directed to a feeder for feeding high temperature materials. The feeder includes a housing having an inlet end and an outlet end. A stator is mounted adjacent the inlet end and projects into the housing. Said stator has a pair of spaced refractory inserts on an internal face thereof. Each stator insert has an exposed surface which is smaller than an opposite surface thereof.

The feeder includes a movable feed member for moving material from said inlet end towards said outlet end. The feed member has a plurality of blades. Each blade has a terminal end portion supporting a refractory insert. Each blade insert has an exposed surface which is smaller than an opposite surface thereof.

The spacing between the stator inserts corresponds generally to the spacing between said blade inserts so that the exposed surface on each stator insert is juxtaposed to the exposed surface of a blade insert in one position of said feed member. A means is provided for moving the feed member relative to the stator.

In a preferred embodiment of the present invention, the refractory inserts used on the blades are provided with a camber. When the inserts are inserted endwise into a recess on the blades, the camber is straightened out but acts as a spring for retaining the inserts in a predetermined position. The stator inserts are likewise provided with a camber which is straightened out and retained in position by a cantilever spring on the stator. Thus, each of the inserts is maintained in an operative position without the use of any external fasteners, adhesives, or the like. Such lack of external fasteners has been found to be highly desirable for use at operating temperatures up to 2300° F.

It is an object of the present invention to provide a feeder for feeding particulate material at temperatures up to about 2300° F.

It is another object of the present invention to provide a rotary feeder for feeding high temperature abrasive materials while having long life and being structurally interrelated so as to facilitate ease of maintenance and/or repair.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a vertical sectional view of a feeder in accordance with the present invention.

FIG. 2 is an enlarged detailed view of the structure shown within the phantom circle designated 2 in FIG. 1.

FIG. 3 is a sectional view taken along the line 3—3 in FIG. 2.

FIG. 4 is a partial perspective view of a blade insert.

Referring to the drawing in detail, wherein like numerals indicate like elements, there is shown a feeder in accordance with the present invention designated generally as 10. The feeder 10 includes a housing designated generally as 12 and having side walls 14.

The side walls 14 have a straight portion 16 and an arcuate portion 18 leading to a discharge outlet port 20. The housing 12 is provided with end walls 22, one of which is not shown. Adjacent the inlet end of the housing 12, there is provided a stator designated generally as 24. The stator 24 has a peripheral mounting flange 26 removably bolted to the upper end of the housing 12. The stator 24 has an inlet port 28 which communicates with the hopper spool insert 30 supported thereabove.

The stator inlet port 28 communicates directly with the chamber therebelow and having a shape defined by vertically disposed end walls 31 and converging side walls 32, 33. The internal surface of the walls 32 and 33 are identical. Hence, only the internal surface of wall 33 will be described in detail.

Referring to FIG. 2, it will be noted that the exposed internal surface of the wall 33 is designated as 34 and is arcuate. Surface 34 is provided with a radially outwardly directed slot 36 and a contiguous recess of shorter depth and defined by the shoulder 38 and cam surface 40. Due to the greater depth of the slot 36 as compared with the depth of the recess, the stator is provided with a cantilever spring portion 42. A refractory insert 44 is provided within the recess and slot as shown more clearly in FIG. 2.

The refractory insert 44 is provided with an exposed surface which is smaller than the opposite surface juxtaposed to shoulder 38. The said oppositely disposed surfaces are innerconnected by the inclined surface in contact with the cam surface 40 which is disposed at an angle of about 30° with respect to a vertical plane in FIG. 2. The cantilever spring portion 42 on a face contiguous with the slot 36 abuts a side face of the insert 44 and biases the same against the cam surface 40. The dimensions of the insert 44 are chosen so that it is necessary to apply wedges into the slot 36 to thereby spread the cantilever spring portion 42 for a slight distance (0.005 to 0.050 inches) prior to introducing the insert 44. Hence, the cantilever spring portion 44 applies a biasing pressure against the entire side face of the insert 44 and straightens out any camber in the insert 44. Thus, there are no discrete fasteners used to mount the insert 44 in position on the exposed surface 34.

A movable feed member is provided within the housing 12 to cause movement of particulate material from the inlet 28 to the outlet port 20. The preferred embodiment of such a movable feed member is a rotor designated generally as 48. The rotor 48 has a hub 50 removably connected to a drive shaft for rotating the rotor 48.

The rotor 48 is provided with a plurality of radially outwardly directed blades 54. The terminal end portion of the blades 54 is designated 56. The portions 56 extend too but are slightly spaced from the arcuate surface 34 which has its radius of curvature located at the longitudinal axis of shaft 52. Each terminal end portion 56 is provided with a removable refractory insert 58. It will be noted that the distance or spacing between the stator inserts 44 corresponds to the spacing between two adjacent blade inserts 58.

The blade inserts 58 have an exposed surface 60 which is smaller than the opposite surface on the insert 58. The preferred cross sectional shape of inserts 58 is that of a truncated triangle having an included angle of about 30°. Thus, the inserts 58 have a dove-tailed mounting with their terminal end portions 56. When inserts 44 and 58 are opposite another as shown in FIG. 2, the clearance between their exposed surfaces may vary between about 0.003 inches to 0.060 inches with practically none of the side faces of the inserts being exposed.

The rotor 48 is preferably provided with end walls 62 each of which is notched so as to accommodate insertion and removal of the inserts 58 in an endwise direction. The inserts 44 are likewise preferably introduced and removed from their operative position in an endwise direction. To facilitate replacement without effecting the installation of the feeder, each of the end walls 22 of the housing 12 is provided with an access opening 64. A panel 66 overlies each opening 64 and is removably bolted to the end walls 22. As will be seen in FIG. 1, the size of the opening 64 facilitates removal of each of the stator inserts 44 and two adjacent ones of the blade inserts 58.

A wide variety of refractory materials are commercially available for use as the stator and blade inserts. The refractory inserts are preferably a high temperature, hard ceramic such as aluminum oxide. Ceramic inserts of aluminum oxide have a hardness of about Rockwell 79; a specific gravity of 3.6; and a softening temperature (temperature at which inserts support their own weight) of about 3100° F. The degree of camber on said inserts prior to installation can vary between 0.005 and 0.020 inches.

The inserts 44 and 58 are located at the areas of greatest wear. The refractory inserts of the present invention not only increase the operating temperature up to about 2300° F. but also increase the operating life during heavy duty use at elevated temperatures by about tenfold. At the same time, the specific geometric shapes of the inserts and their structural interrelationship whereby they are mounted within any external fasteners provides for reliable operation in combination with the ability to replace the inserts with minimum down time on a working unit without removing the feeder from its mounted orientation.

The particles of material which are handled by the feeder 10 are regulated by volumetric capacity of the chambers between adjacent blades and the speed of the rotor 48. As a chamber between adjacent blades moves away from the stator 24, the material therebetween may fall unrestricted through the space between the circumference of the roller 48 and the curve walls 18.

The rotor 48 is driven by shaft 52. Shaft 52 may be driven by any one of a wide variety of motor means. In a preferred embodiment, the shaft 52 terminates in a sprocket driven by a chain connected to the output from the gear motor mounted on or adjacent the housing 12. The feeder may be furnished in various sizes.

The feeder 10 may be provided with a variety of conventional equipment not shown. For example, the shaft 52 will be provided with appropriate stuffing boxes, packing rings, and other seals to prevent particles or gases from leaking around the shaft to the outside. If desired, the drive motor for shaft 52 may be a reversing drive having self-reversing switches. With such a reversing drive and reversing switches, when an obstruction tends to stall the rotor 48, the motor support can oscillate and actuate the limit switches to reverse the motor. If the obstruction still stalls the rotor 48, the motor support will oscillate in the opposite direction likewise causing another reversal. If desired, conventional temperature sensitive devices for sensing the temperature of the material being fed may be provided.

The present invention may be embodied in other specific forms without departing from the spirit or essential attributes thereof and, accordingly, reference should be made to the appended claims, rather than to the foregoing specification as indicating the scope of the invention.

I claim:

1. A feeder for feeding high temperature material comprising:
   (a) a housing having an inlet end and an outlet end,
   (b) a stator adjacent said inlet end, said stator having a pair of spaced refractory inserts on an internal face thereof disposed within said housing, each insert having an exposed surface which is smaller than an opposite surface,
   (c) a movable feed member in said housing for moving material from said inlet end toward said outlet end, said feed member having a plurality of blades, each of said blades having a terminal end portion supporting a refractory insert, each blade insert having an exposed surface which is smaller than an opposite surface,
   (d) the spacing between said stator inserts corresponding generally to the spacing between said blade inserts so that the exposed surface on each stator insert is juxtaposed to the exposed surface of a blade insert in one position of said feed member, and
   (e) means for moving said feed member relative to said stator.

2. A feeder in accordance with claim 1 including means for retaining each insert in an operative position without the use of any external fasteners or attaching means.

3. A feeder in accordance with claim 2 wherein each of said stator inserts is mounted within a recess contiguous with a slot, each of said slots extending along a side face of its respective stator insert and being substantially deeper than its associated recess so that the adjacent portion of the stator acts as a cantilever spring to retain the stator insert in position.

4. A feeder in accordance with claim 2 wherein said means for retaining the blade inserts includes a slot at the terminal end portion of each blade constructed so as to have the configuration of a truncated triangle with the widest portion of the triangle being radially inwardly from the narrowest portion of the triangle.

5. A feeder in accordance with claim 4 wherein said feed member is a rotor having end walls, said end walls having a slot aligned with each of the slots at the terminal end portions of the blade to facilitate removal of the blade inserts in a lengthwise direction, and said housing having an access opening adjacent the elevation of the stator inserts to facilitate removal of said inserts in a lengthwise direction.

6. A feeder in accordance with claim 1 wherein each of said inserts has a camber of between 0.005 and 0.020 inches.

7. A feeder in accordance with claim 6 wherein each insert has a side face disposed at an angle of about 30° with respect to a vertical plane.

8. A rotary feeder for feeding abrasive material at temperatures up to about 2300° F. comprising a housing having an inlet and an outlet, a stator having an arcuate surface within said housing, a rotor in said housing for moving material from said inlet to said outlet, said rotor having a plurality of blades, the periphery of each blade being positionable by rotation of the rotor so as to be juxtaposed to said arcuate surface on said stator, a drive shaft for said rotor, said drive shaft extending through an end wall of said housing for connection to a drive motor, the improvement comprising the terminal end portion of each blade having a recess receiving a high temperature refractory insert with a surface of the insert being exposed, said arcuate surface on said stator having a pair of spaced parallel recesses, each of the stator recesses receiving a high temperature refractory insert with an exposed surface on the stator insert juxtaposed to the exposed surface on one of the blade inserts, each of the inserts having a transverse dimension greater than the transverse dimension of its exposed surface.

9. A feeder in accordance with claim 8 wherein said housing is provided with a access opening adjacent the end of the stator recesses to facilitate insertion and removal of inserts in a lengthwise direction into the stator recesses and the blade recesses, and a removable panel overlying said access opening.

10. A feeder in accordance with claim 9 wherein each of said inserts has a camber of between 0.005 and 0.020 inches in an unmounted state of the insert which is removed when the inserts are introduced into the recesses, said recesses being straight.

11. A feeder in accordance with claim 8 wherein at least some of said inserts are mounted in a recess contiguous with a slot radially disposed with respect to said rotor, the slot being deeper than the associated recess, at least one side face of the recess being disposed at an acute angle with respect to a radius of said rotor.

12. A feeder in accordance with claim 8 wherein said inserts each have four faces with only one face constituting the exposed surface.

* * * * *